(12) United States Patent
O'Connor et al.

(10) Patent No.: US 11,555,473 B2
(45) Date of Patent: Jan. 17, 2023

(54) DUAL BLADDER FUEL TANK

(71) Applicant: KONTAK LLC, Redmond, WA (US)

(72) Inventors: David O'Connor, North Bend, WA (US); Damien Wilson, Redmond, WA (US)

(73) Assignee: KONTAK LLC, Redmond, WA (US)

( * ) Notice: Subject to any disclaimer, the term of this patent is extended or adjusted under 35 U.S.C. 154(b) by 421 days.

(21) Appl. No.: 16/425,079

(22) Filed: May 29, 2019

(65) Prior Publication Data
US 2020/0049114 A1    Feb. 13, 2020

Related U.S. Application Data

(60) Provisional application No. 62/677,620, filed on May 29, 2018.

(51) Int. Cl.
*B60K 15/03* (2006.01)
*F02M 37/00* (2006.01)

(52) U.S. Cl.
CPC ......... *F02M 37/0082* (2013.01); *B60K 15/03* (2013.01); *F02M 37/0088* (2013.01); *B60K 2015/0321* (2013.01); *B60K 2015/03052* (2013.01); *B60K 2015/03085* (2013.01); *B60K 2015/03296* (2013.01)

(58) Field of Classification Search
CPC ........... F02M 37/0088; F02M 37/0094; F02M 37/0082; B60K 15/03; B60K 2015/03085; B60K 2015/03052; B60K 2015/03296
See application file for complete search history.

(56) References Cited

U.S. PATENT DOCUMENTS 2,612,215 A * 9/1952 Miles ..................... F02M 37/20
                                                  137/565.15
3,968,896 A * 7/1976 Giacoletti .............. B60K 15/03
                                                  73/306

(Continued)

FOREIGN PATENT DOCUMENTS

JP    2006-248814    9/2006
JP    2006-293079    10/2006

(Continued)

OTHER PUBLICATIONS

International Search Report and Written Opinion issued in PCT/US2018/034959 dated Feb. 7, 2019.

(Continued)

*Primary Examiner* — Jeffrey J Restifo
(74) *Attorney, Agent, or Firm* — Perkins Coie LLP

(57) ABSTRACT

A fluid tank comprising can include an outer housing comprising a housing volume, a first fluid bladder positioned within the housing volume, and a second fluid bladder positioned within the housing volume. The first fluid bladder can comprise a first conduit and the second fluid bladder can comprise a second conduit. The first fluid bladder can be configured to release fluid through the first conduit in response to introduction of fluid into the second fluid bladder via the second conduit. The housing volume can be maintained at a substantially constant pressure when fluid is released from the first fluid bladder through the first conduit and fluid is introduced into the second fluid bladder through the second conduit.

12 Claims, 4 Drawing Sheets

(56) References Cited

U.S. PATENT DOCUMENTS

| | | |
|---|---|---|
| 3,972,372 A | 8/1976 | Fisher et al. |
| 4,105,455 A | 8/1978 | Nagano et al. |
| 4,237,111 A | 12/1980 | Wallevik et al. |
| 4,716,064 A | 12/1987 | Benander et al. |
| 4,729,891 A | 3/1988 | Kulkarni |
| 4,921,531 A | 5/1990 | Nagle et al. |
| 4,952,539 A | 8/1990 | Melas et al. |
| 5,075,090 A | 12/1991 | Lewis et al. |
| 5,110,996 A | 5/1992 | Edwards |
| 5,152,048 A | 10/1992 | Nebe et al. |
| 5,200,145 A | 4/1993 | Kear et al. |
| 5,240,682 A | 8/1993 | Whittenberger et al. |
| 5,321,896 A | 6/1994 | Raddatz et al. |
| 5,325,601 A | 7/1994 | Raddatz et al. |
| 5,350,003 A | 9/1994 | Fareed et al. |
| 5,423,372 A | 6/1995 | Kearney |
| 5,443,727 A | 8/1995 | Gagnon |
| 5,651,906 A | 7/1997 | Whittenberger et al. |
| 5,737,839 A | 4/1998 | Whittenberger et al. |
| 5,781,289 A | 7/1998 | Bussiere et al. |
| 5,820,835 A | 10/1998 | Whittenberger et al. |
| 5,846,495 A | 12/1998 | Whittenberger et al. |
| 5,847,353 A | 12/1998 | Surma et al. |
| 5,878,752 A | 3/1999 | Morgan et al. |
| 5,958,273 A | 9/1999 | Koch et al. |
| 6,001,204 A | 12/1999 | Haelg et al. |
| 6,018,471 A | 1/2000 | Surma et al. |
| 6,066,825 A | 5/2000 | Surma et al. |
| 6,074,447 A | 6/2000 | Jensen |
| 6,086,792 A | 7/2000 | Reid et al. |
| 6,215,678 B1 | 4/2001 | Titus |
| 6,261,679 B1 | 7/2001 | Qin et al. |
| 6,315,972 B1 | 11/2001 | Koch et al. |
| 6,383,706 B1 | 5/2002 | Tirado et al. |
| 6,488,838 B1 | 12/2002 | Fitzgerald et al. |
| 6,509,555 B1 | 1/2003 | Riess et al. |
| 6,603,054 B2 | 8/2003 | Qin et al. |
| 6,624,337 B1 | 9/2003 | Lundgren et al. |
| 6,630,113 B1 | 10/2003 | Surma |
| 6,639,197 B2 | 10/2003 | Riess et al. |
| 6,639,198 B2 | 10/2003 | Riess et al. |
| 6,689,252 B1 | 2/2004 | Shamouilian et al. |
| 6,710,314 B2 | 3/2004 | Riess et al. |
| 6,726,962 B1 | 4/2004 | Loszewski |
| 6,803,550 B2 | 10/2004 | Crowe et al. |
| 6,830,822 B2 | 12/2004 | Yadav |
| 6,849,109 B2 | 2/2005 | Yadav et al. |
| 6,849,837 B2 | 2/2005 | Riess et al. |
| 6,858,302 B2 | 2/2005 | Loszewski |
| 6,858,521 B2 | 2/2005 | Jin |
| 6,926,949 B1 | 8/2005 | Haelg et al. |
| 7,033,650 B2 | 4/2006 | Tang et al. |
| 7,070,743 B2 | 7/2006 | Fallon et al. |
| 7,168,534 B2 | 1/2007 | Messier |
| 7,185,659 B2 | 3/2007 | Sharpe |
| 7,186,396 B2 | 3/2007 | Naeemi et al. |
| 7,205,513 B2 | 4/2007 | Domoto et al. |
| 7,233,101 B2 | 6/2007 | Jin |
| 7,323,666 B2 | 1/2008 | Sharma et al. |
| 7,341,285 B2 | 3/2008 | McPherson |
| 7,351,395 B1 | 4/2008 | Wilhelm et al. |
| 7,361,207 B1 | 4/2008 | Filippov et al. |
| 7,365,289 B2 | 4/2008 | Darsey et al. |
| 7,387,673 B2 | 6/2008 | Yadav et al. |
| 7,390,360 B2 | 6/2008 | Shenai et al. |
| 7,413,793 B2 | 8/2008 | Lewis et al. |
| 7,473,873 B2 | 1/2009 | Darsey et al. |
| 7,517,829 B2 | 4/2009 | Warlimont et al. |
| 7,559,494 B1 | 7/2009 | Yadav et al. |
| 7,569,624 B2 | 8/2009 | Sebald et al. |
| 7,655,703 B2 | 2/2010 | Batdorf |
| 7,713,350 B2 | 5/2010 | Yadav |
| 7,745,355 B2 | 6/2010 | Sharma et al. |
| 7,776,383 B2 | 8/2010 | Yadav et al. |
| 7,794,797 B2 | 9/2010 | Vasenkov |
| 7,816,006 B2 | 10/2010 | Yadav et al. |
| 7,816,415 B2 | 10/2010 | Quapp et al. |
| 7,827,822 B2 | 11/2010 | Weinhold et al. |
| 7,863,522 B2 | 1/2011 | Paquette et al. |
| 7,866,386 B2 | 1/2011 | Beer et al. |
| 7,866,388 B2 | 1/2011 | Bravo |
| 7,931,784 B2 | 4/2011 | Medoff |
| 7,932,065 B2 | 4/2011 | Medoff |
| 7,955,508 B2 | 6/2011 | Flynn et al. |
| 7,976,692 B2 | 7/2011 | Zhang et al. |
| 8,011,451 B2 | 9/2011 | MacDonald |
| 8,017,892 B2 | 9/2011 | Darsey et al. |
| 8,057,666 B2 | 11/2011 | Flynn et al. |
| 8,080,735 B2 | 12/2011 | Biscoglio et al. |
| 8,083,906 B2 | 12/2011 | Medoff |
| 8,092,558 B2 | 1/2012 | O'Connor et al. |
| 8,113,272 B2 | 2/2012 | Vinegar |
| 8,142,620 B2 | 3/2012 | Medoff |
| 8,146,661 B2 | 4/2012 | Harvey, III et al. |
| 8,146,669 B2 | 4/2012 | Mason |
| 8,151,907 B2 | 4/2012 | MacDonald |
| 8,153,942 B2 | 4/2012 | Biris et al. |
| 8,158,818 B2 | 4/2012 | Frey et al. |
| 8,162,059 B2 | 4/2012 | Bass et al. |
| 8,162,405 B2 | 4/2012 | Burns et al. |
| 8,168,038 B2 | 5/2012 | Medoff |
| 8,172,335 B2 | 5/2012 | Burns et al. |
| 8,177,305 B2 | 5/2012 | Burns et al. |
| 8,192,809 B2 | 6/2012 | Basu et al. |
| 8,196,658 B2 | 6/2012 | Uwechue et al. |
| 8,197,889 B2 | 6/2012 | Veith et al. |
| 8,212,087 B2 | 7/2012 | Medoff |
| 8,220,539 B2 | 7/2012 | Nguyen et al. |
| 8,236,535 B2 | 8/2012 | Masterman et al. |
| 8,240,774 B2 | 8/2012 | Vinegar |
| 8,256,512 B2 | 9/2012 | Stanecki |
| 8,261,832 B2 | 9/2012 | Ryan |
| 8,267,170 B2 | 9/2012 | Fowler et al. |
| 8,267,185 B2 | 9/2012 | Ocampos et al. |
| 8,272,455 B2 | 9/2012 | Mansure et al. |
| 8,276,636 B2 | 10/2012 | McPherson |
| 8,276,661 B2 | 10/2012 | Vinegar et al. |
| 8,281,861 B2 | 10/2012 | Nguyen et al. |
| 8,292,987 B2 | 10/2012 | Gonze et al. |
| 8,327,932 B2 | 12/2012 | Karanikas et al. |
| 8,329,936 B2 | 12/2012 | Coutable et al. |
| 8,353,347 B2 | 1/2013 | Mason |
| 8,357,883 B2 | 1/2013 | Sato |
| 8,362,407 B2 | 1/2013 | Filippov et al. |
| 8,372,327 B2 | 2/2013 | Masten et al. |
| 8,382,970 B2 | 2/2013 | Zhang et al. |
| 8,414,664 B2 | 4/2013 | Sadowsky et al. |
| 8,434,555 B2 | 5/2013 | Jaiswal et al. |
| 8,448,707 B2 | 5/2013 | Bass |
| 8,454,803 B2 | 6/2013 | Medoff |
| 8,455,580 B2 | 6/2013 | Sengupta et al. |
| 8,459,032 B2 | 6/2013 | Naeemi et al. |
| 8,475,760 B2 | 7/2013 | Sinkko et al. |
| 8,492,128 B2 | 7/2013 | Medoff |
| 8,497,366 B2 | 7/2013 | Medoff |
| 8,518,683 B2 | 8/2013 | Masterman et al. |
| 8,529,738 B2 | 9/2013 | O'Connor et al. |
| 8,535,381 B2 | 9/2013 | O'Connor et al. |
| 8,536,497 B2 | 9/2013 | Kim |
| 8,562,078 B2 | 10/2013 | Burns et al. |
| 8,568,507 B2 | 10/2013 | Edlinger |
| 8,569,526 B2 | 10/2013 | Ceylan et al. |
| 8,576,016 B2 | 11/2013 | Czimmek |
| 8,576,017 B2 | 11/2013 | Czimmek |
| 8,597,921 B2 | 12/2013 | Medoff |
| 8,603,787 B2 | 12/2013 | Medoff |
| 8,609,384 B2 | 12/2013 | Medoff |
| 8,636,323 B2 | 1/2014 | MacDonald et al. |
| 8,637,284 B2 | 1/2014 | Medoff |
| 8,647,401 B2 | 2/2014 | Self et al. |
| 8,680,399 B2 | 3/2014 | Eaton |
| 8,708,691 B2 | 4/2014 | Dykstra et al. |
| 8,709,768 B2 | 4/2014 | Medoff |
| 8,709,771 B2 | 4/2014 | Masterman et al. |

(56) References Cited

U.S. PATENT DOCUMENTS

| | | |
|---|---|---|
| 8,716,537 B2 | 5/2014 | Medoff |
| 8,728,779 B2 | 5/2014 | Medoff |
| 8,734,643 B2 | 5/2014 | Foret |
| 8,734,654 B2 | 5/2014 | Foret |
| 8,747,624 B2 | 6/2014 | Medoff |
| 8,752,904 B2 | 6/2014 | Burns et al. |
| 8,763,231 B2 | 7/2014 | Lewandowski et al. |
| 8,764,948 B2 | 7/2014 | Medoff |
| 8,764,978 B2 | 7/2014 | Foret |
| 8,771,480 B2 | 7/2014 | Medoff |
| 8,835,142 B2 | 9/2014 | Medoff |
| 8,841,101 B2 | 9/2014 | Medoff |
| 8,846,356 B2 | 9/2014 | Medoff |
| 8,849,142 B2 | 9/2014 | Iwasaki et al. |
| 8,851,170 B2 | 10/2014 | Colmenares et al. |
| 8,852,896 B2 | 10/2014 | Medoff |
| 8,852,905 B2 | 10/2014 | Medoff |
| 8,871,964 B2 | 10/2014 | Wichelhaus et al. |
| 8,876,923 B2 | 11/2014 | Cherrillo et al. |
| 8,877,472 B2 | 11/2014 | Medoff |
| 8,881,806 B2 | 11/2014 | Vinegar et al. |
| 8,900,839 B2 | 12/2014 | Medoff |
| 8,946,489 B2 | 2/2015 | Medoff |
| 8,980,602 B2 | 3/2015 | Medoff |
| 8,999,030 B2 | 4/2015 | Schendel et al. |
| 9,010,428 B2 | 4/2015 | Mazyar et al. |
| 9,022,118 B2 | 5/2015 | Burns |
| 9,023,183 B2 | 5/2015 | Medoff |
| 9,023,628 B2 | 5/2015 | Medoff |
| 9,044,900 B2 | 6/2015 | McPherson |
| 9,051,829 B2 | 6/2015 | Vinegar et al. |
| 9,058,918 B2 | 6/2015 | Eaton et al. |
| 9,062,328 B2 | 6/2015 | Medoff |
| 9,074,566 B2 | 7/2015 | Czimmek et al. |
| 9,078,461 B2 | 7/2015 | Medoff |
| 9,089,628 B2 | 7/2015 | Loh et al. |
| 9,101,880 B2 | 8/2015 | Geus et al. |
| 9,109,241 B2 | 8/2015 | Masterman et al. |
| 9,129,728 B2 | 9/2015 | MacDonald et al. |
| 9,132,407 B1 | 9/2015 | Medoff |
| 9,138,715 B2 | 9/2015 | Medoff |
| 9,163,114 B2 | 10/2015 | Budhlall et al. |
| 9,175,137 B2 | 11/2015 | Sahagun et al. |
| 9,186,646 B2 | 11/2015 | Medoff |
| 9,187,769 B1 | 11/2015 | Medoff |
| 9,208,923 B2 | 12/2015 | Smith et al. |
| 9,212,591 B2 | 12/2015 | Cosby et al. |
| 9,278,896 B1 | 3/2016 | Medoff |
| 9,283,537 B2 | 3/2016 | Medoff |
| 9,285,403 B2 | 3/2016 | Czimmek |
| 9,290,780 B2 | 3/2016 | Masterman et al. |
| 9,309,545 B2 | 4/2016 | Medoff |
| 9,334,843 B2 | 5/2016 | Cosby et al. |
| 9,347,661 B2 | 5/2016 | Medoff |
| 9,352,294 B1 | 5/2016 | Medoff |
| 9,400,439 B2 | 7/2016 | Takahashi et al. |
| 9,404,005 B2 | 8/2016 | Vaughan et al. |
| 9,409,140 B2 | 8/2016 | Medoff |
| 9,421,523 B2 | 8/2016 | Naeemi et al. |
| 9,446,371 B2 | 9/2016 | Foret |
| 9,475,698 B2 | 10/2016 | Wood et al. |
| 9,493,796 B2 | 11/2016 | Masterman et al. |
| 9,517,444 B2 | 12/2016 | Medoff |
| 9,528,322 B2 | 12/2016 | Macdonald |
| 9,587,258 B2 | 3/2017 | Medoff |
| 9,605,287 B2 | 3/2017 | Medoff |
| 9,605,288 B2 | 3/2017 | Medoff |
| 9,607,732 B2 | 3/2017 | Kjellqvist et al. |
| 9,618,947 B2 | 4/2017 | Czimmek |
| 9,623,393 B2 | 4/2017 | Bore et al. |
| 9,657,622 B2 | 5/2017 | Douglas et al. |
| 9,676,491 B2 | 6/2017 | Delgado et al. |
| 9,695,280 B2 | 7/2017 | Zhang et al. |
| 9,700,868 B2 | 7/2017 | Medoff |
| 9,745,604 B2 | 8/2017 | Medoff |
| 9,745,609 B2 | 8/2017 | Medoff |
| 9,758,638 B2 | 9/2017 | Cree |
| 9,803,222 B2 | 10/2017 | Medoff |
| 2001/0024716 A1 | 9/2001 | Qin et al. |
| 2002/0102353 A1 | 8/2002 | Tang et al. |
| 2003/0071033 A1 | 4/2003 | Riess et al. |
| 2003/0075540 A1 | 4/2003 | Riess et al. |
| 2003/0121909 A1 | 7/2003 | Riess et al. |
| 2003/0175196 A1 | 9/2003 | Fallon et al. |
| 2003/0207112 A1 | 11/2003 | Yadav |
| 2003/0212179 A1 | 11/2003 | Yadav et al. |
| 2003/0220039 A1 | 11/2003 | Qin et al. |
| 2004/0050839 A1 | 3/2004 | Riess et al. |
| 2004/0076810 A1 | 4/2004 | Blain et al. |
| 2004/0127012 A1 | 7/2004 | Jin |
| 2004/0129555 A1 | 7/2004 | Flock et al. |
| 2004/0139888 A1 | 7/2004 | Yadav et al. |
| 2004/0149297 A1 | 8/2004 | Sharpe |
| 2004/0149737 A1 | 8/2004 | Crowe et al. |
| 2004/0150311 A1 | 8/2004 | Jin et al. |
| 2004/0155096 A1 | 8/2004 | Falkenberg et al. |
| 2004/0157002 A1 | 8/2004 | Bons et al. |
| 2004/0170820 A1 | 9/2004 | Yadav et al. |
| 2004/0180203 A1 | 9/2004 | Yadav et al. |
| 2004/0185384 A1 | 9/2004 | Suganuma et al. |
| 2004/0199039 A1 | 10/2004 | Chadwell et al. |
| 2004/0229295 A1 | 11/2004 | Flock et al. |
| 2004/0249037 A1 | 12/2004 | Pridohl et al. |
| 2005/0013767 A1 | 1/2005 | Bagzis |
| 2005/0107251 A1 | 5/2005 | Warlimont et al. |
| 2005/0121437 A1 | 6/2005 | Sharma et al. |
| 2005/0208218 A1 | 9/2005 | Becker et al. |
| 2005/0212297 A1 | 9/2005 | McPherson |
| 2005/0255370 A1 | 11/2005 | Figueroa et al. |
| 2005/0287297 A1 | 12/2005 | Darsey et al. |
| 2006/0011173 A1* | 1/2006 | Davis ............... B60K 15/03504 123/520 |
| 2006/0051281 A1 | 3/2006 | Taylor et al. |
| 2006/0068080 A1 | 3/2006 | Yadav et al. |
| 2006/0115595 A1 | 6/2006 | Woelk et al. |
| 2006/0289481 A1 | 6/2006 | Woelk et al. |
| 2007/0003476 A1 | 1/2007 | Ratner et al. |
| 2007/0068933 A1 | 3/2007 | Darsey et al. |
| 2007/0110985 A1 | 5/2007 | Lewis et al. |
| 2007/0204512 A1 | 9/2007 | Self et al. |
| 2007/0210075 A1 | 9/2007 | Self et al. |
| 2008/0035682 A1 | 2/2008 | Filippov et al. |
| 2008/0045408 A1 | 2/2008 | Buarque |
| 2008/0045412 A1 | 2/2008 | Buarque |
| 2008/0124994 A1 | 5/2008 | Sharma et al. |
| 2008/0142367 A1 | 6/2008 | West et al. |
| 2008/0149363 A1 | 6/2008 | Cieslinski et al. |
| 2008/0156228 A1 | 7/2008 | Yadav |
| 2008/0182027 A1 | 7/2008 | Vasenkov |
| 2008/0182911 A1 | 7/2008 | Batdorf |
| 2008/0187907 A1 | 8/2008 | Nackos et al. |
| 2008/0197534 A1 | 8/2008 | Ichikawa |
| 2008/0223851 A1 | 9/2008 | Darsey et al. |
| 2008/0243049 A1 | 10/2008 | Hardy |
| 2008/0264330 A1 | 10/2008 | Darsey et al. |
| 2008/0272116 A1* | 11/2008 | Martucci ............ F02M 37/0082 220/4.13 |
| 2008/0274280 A1 | 11/2008 | Darsey et al. |
| 2008/0294089 A1 | 11/2008 | Hardy |
| 2008/0311045 A1 | 12/2008 | Hardy |
| 2008/0319375 A1 | 12/2008 | Hardy |
| 2009/0011180 A1 | 1/2009 | Ichikawa |
| 2009/0014121 A1 | 1/2009 | McPherson |
| 2009/0019768 A1 | 1/2009 | Toseland et al. |
| 2009/0023821 A1 | 1/2009 | Batdorf et al. |
| 2009/0025425 A1 | 1/2009 | Yuhas et al. |
| 2009/0074630 A1 | 3/2009 | Gonze et al. |
| 2009/0074905 A1 | 3/2009 | Matsen et al. |
| 2009/0093886 A1 | 4/2009 | Nelson et al. |
| 2009/0184281 A1 | 7/2009 | Yadav et al. |
| 2009/0185964 A1 | 7/2009 | Nelson et al. |
| 2009/0189617 A1 | 7/2009 | Burns et al. |
| 2009/0194269 A1 | 8/2009 | Mnegar |
| 2009/0194282 A1 | 8/2009 | Beer et al. |

(56) References Cited

U.S. PATENT DOCUMENTS

| | | |
|---|---|---|
| 2009/0194286 A1 | 8/2009 | Mason |
| 2009/0194287 A1 | 8/2009 | Carroll et al. |
| 2009/0194329 A1 | 8/2009 | Mansure et al. |
| 2009/0194333 A1 | 8/2009 | MacDonald |
| 2009/0194524 A1 | 8/2009 | Kim |
| 2009/0200022 A1 | 8/2009 | Harvey, III et al. |
| 2009/0200023 A1 | 8/2009 | Vinegar et al. |
| 2009/0200025 A1 | 8/2009 | Bravo |
| 2009/0200031 A1 | 8/2009 | Uwechue et al. |
| 2009/0200290 A1 | 8/2009 | Cardinal et al. |
| 2009/0200854 A1 | 8/2009 | Vinegar |
| 2009/0208684 A1 | 8/2009 | Dunleavy et al. |
| 2009/0233349 A1 | 9/2009 | Veith et al. |
| 2009/0236329 A1 | 9/2009 | Sato |
| 2009/0257945 A1 | 10/2009 | Biris et al. |
| 2009/0260823 A1 | 10/2009 | MacDonald et al. |
| 2009/0260824 A1 | 10/2009 | Burns et al. |
| 2009/0272526 A1 | 11/2009 | Burns et al. |
| 2009/0272533 A1 | 11/2009 | Burns et al. |
| 2009/0272535 A1 | 11/2009 | Burns et al. |
| 2009/0272536 A1 | 11/2009 | Burns et al. |
| 2009/0272578 A1 | 11/2009 | MacDonald |
| 2009/0286295 A1 | 11/2009 | Masterman et al. |
| 2009/0311445 A1 | 12/2009 | Vasenkov |
| 2010/0021748 A1 | 1/2010 | Qi et al. |
| 2010/0032308 A1 | 2/2010 | Zhang et al. |
| 2010/0055349 A1 | 3/2010 | Basu et al. |
| 2010/0069656 A1 | 3/2010 | Baumann et al. |
| 2010/0071903 A1 | 3/2010 | MacDonald et al. |
| 2010/0071904 A1 | 3/2010 | Burns et al. |
| 2010/0072429 A1 | 3/2010 | Rajala et al. |
| 2010/0087687 A1 | 4/2010 | Medoff |
| 2010/0089584 A1 | 4/2010 | Burns |
| 2010/0089586 A1 | 4/2010 | Stanecki |
| 2010/0096137 A1 | 4/2010 | Nguyen et al. |
| 2010/0101783 A1 | 4/2010 | Nguyen et al. |
| 2010/0101784 A1 | 4/2010 | Nguyen et al. |
| 2010/0101794 A1 | 4/2010 | Ryan |
| 2010/0101823 A1 | 4/2010 | Eaton |
| 2010/0108310 A1 | 5/2010 | Fowler et al. |
| 2010/0108379 A1 | 5/2010 | MacDonald et al. |
| 2010/0108567 A1 | 5/2010 | Medoff |
| 2010/0112242 A1 | 5/2010 | Medoff |
| 2010/0124583 A1 | 5/2010 | Medoff |
| 2010/0147521 A1 | 6/2010 | Vinegar et al. |
| 2010/0147522 A1 | 6/2010 | Vinegar et al. |
| 2010/0154727 A1* | 6/2010 | Malgorn ............... B01D 17/045 123/2 |
| 2010/0155070 A1 | 6/2010 | Nair et al. |
| 2010/0179315 A1 | 7/2010 | Medoff |
| 2010/0206570 A1 | 8/2010 | Cao et al. |
| 2010/0209056 A1 | 8/2010 | Chaudhary et al. |
| 2010/0224368 A1 | 9/2010 | Mason |
| 2010/0249404 A1 | 9/2010 | Friese |
| 2010/0258265 A1 | 10/2010 | Pollard et al. |
| 2010/0258290 A1 | 10/2010 | Bass |
| 2010/0258291 A1 | 10/2010 | Harley et al. |
| 2010/0258309 A1 | 10/2010 | Colmenares et al. |
| 2010/0304439 A1 | 12/2010 | Medoff |
| 2010/0304440 A1 | 12/2010 | Medoff |
| 2010/0316882 A1 | 12/2010 | Truesdale et al. |
| 2011/0008246 A1 | 1/2011 | Filippov et al. |
| 2011/0020214 A1 | 1/2011 | Nelson et al. |
| 2011/0027837 A1 | 2/2011 | Medoff |
| 2011/0039317 A1 | 2/2011 | Medoff |
| 2011/0042084 A1 | 2/2011 | Bos et al. |
| 2011/0042201 A1 | 2/2011 | Von Gutfeld et al. |
| 2011/0052460 A1 | 3/2011 | Filippov et al. |
| 2011/0056124 A1 | 3/2011 | Sadowsky et al. |
| 2011/0067576 A1 | 3/2011 | Gaeta et al. |
| 2011/0081335 A1 | 4/2011 | Medoff |
| 2011/0081336 A1 | 4/2011 | Medoff |
| 2011/0094772 A1 | 4/2011 | Gross et al. |
| 2011/0111456 A1 | 5/2011 | Medoff |
| 2011/0147041 A1 | 6/2011 | Caronia et al. |
| 2011/0147639 A1 | 6/2011 | Gowell et al. |
| 2011/0155559 A1 | 6/2011 | Medoff |
| 2011/0179907 A1 | 7/2011 | Edlinger |
| 2011/0209897 A1 | 9/2011 | Denton et al. |
| 2011/0232169 A1 | 9/2011 | Cherrillo et al. |
| 2011/0271588 A1 | 11/2011 | Jader et al. |
| 2011/0272082 A1 | 11/2011 | Dunleavy et al. |
| 2011/0297623 A1 | 12/2011 | Foret |
| 2011/0300029 A1 | 12/2011 | Foret |
| 2011/0301363 A1 | 12/2011 | Friese |
| 2011/0303532 A1 | 12/2011 | Foret |
| 2012/0017422 A1 | 1/2012 | Lewandowski et al. |
| 2012/0039781 A1 | 2/2012 | Geus et al. |
| 2012/0065307 A1 | 3/2012 | Brown et al. |
| 2012/0077247 A1 | 3/2012 | Medoff |
| 2012/0094355 A1 | 4/2012 | Medoff |
| 2012/0094358 A1 | 4/2012 | Medoff |
| 2012/0142065 A1 | 6/2012 | Medoff |
| 2012/0142068 A1 | 6/2012 | Medoff |
| 2012/0202994 A1 | 8/2012 | Wichelhaus et al. |
| 2012/0203021 A1 | 8/2012 | Coutable et al. |
| 2012/0215023 A1 | 8/2012 | Wichelhaus et al. |
| 2012/0003704 A1 | 9/2012 | Medoff |
| 2012/0231197 A1 | 9/2012 | Mitchell |
| 2012/0237984 A1 | 9/2012 | Medoff |
| 2012/0267359 A1 | 10/2012 | Czimmek |
| 2012/0267448 A1 | 10/2012 | Czimmek et al. |
| 2012/0268219 A1 | 10/2012 | Czimmek |
| 2012/0277329 A1 | 11/2012 | Galloway |
| 2012/0283449 A1 | 11/2012 | Friese et al. |
| 2012/0289734 A1 | 11/2012 | Kaufmann et al. |
| 2012/0291343 A1 | 11/2012 | Jader et al. |
| 2012/0309060 A1 | 12/2012 | Medoff |
| 2012/0309100 A1 | 12/2012 | Oen et al. |
| 2012/0315060 A1 | 12/2012 | Iwasaki et al. |
| 2012/0316376 A1 | 12/2012 | Medoff |
| 2013/0011895 A1 | 1/2013 | Masterman et al. |
| 2013/0026752 A1 | 1/2013 | McPherson |
| 2013/0056209 A1 | 3/2013 | Mazyar et al. |
| 2013/0101326 A1 | 4/2013 | Zhang et al. |
| 2013/0101983 A1 | 4/2013 | Chandra |
| 2013/0102029 A1 | 4/2013 | Medoff |
| 2013/0122764 A1 | 5/2013 | Matsen et al. |
| 2013/0150533 A1 | 6/2013 | Budhlall et al. |
| 2013/0164818 A9 | 6/2013 | Medoff |
| 2013/0175068 A1 | 7/2013 | Stevens et al. |
| 2013/0183735 A9 | 7/2013 | Medoff |
| 2013/0196386 A1 | 8/2013 | Medoff |
| 2013/0216520 A9 | 8/2013 | Medoff |
| 2013/0225714 A1 | 8/2013 | Medoff |
| 2013/0261340 A1 | 10/2013 | Medoff |
| 2013/0266556 A9 | 10/2013 | Medoff |
| 2013/0273612 A1 | 10/2013 | Medoff |
| 2013/0288307 A1 | 10/2013 | Medoff |
| 2013/0295624 A1 | 11/2013 | Masterman et al. |
| 2013/0303810 A1 | 11/2013 | Handerek |
| 2013/0315028 A1 | 11/2013 | Smith |
| 2014/0030763 A1 | 1/2014 | Medoff |
| 2014/0030768 A1 | 1/2014 | Medoff |
| 2014/0033777 A1 | 2/2014 | Schendel et al. |
| 2014/0147907 A1 | 5/2014 | Masterman et al. |
| 2014/0148568 A1 | 5/2014 | Mabry et al. |
| 2014/0154749 A1 | 6/2014 | Medoff |
| 2014/0182272 A1 | 7/2014 | Hornby et al. |
| 2014/0182366 A1 | 7/2014 | Cosby et al. |
| 2014/0182563 A1 | 7/2014 | Czimmek |
| 2014/0183185 A1 | 7/2014 | Czimmek |
| 2014/0187416 A1 | 7/2014 | Naeemi et al. |
| 2014/0197154 A1 | 7/2014 | Czimmek |
| 2014/0197854 A1 | 7/2014 | Czimmek |
| 2014/0329091 A1 | 11/2014 | Koh et al. |
| 2014/0329280 A1 | 11/2014 | Medoff |
| 2014/0329961 A1 | 11/2014 | Smith et al. |
| 2014/0334999 A1 | 11/2014 | Foret |
| 2014/0348982 A1 | 11/2014 | Medoff |
| 2014/0374237 A1 | 12/2014 | Medoff |
| 2015/0004669 A1 | 1/2015 | Medoff |
| 2015/0021094 A1 | 1/2015 | MacDonald |
| 2015/0044122 A1 | 2/2015 | Zikeli et al. |

(56) References Cited

U.S. PATENT DOCUMENTS

| | | | |
|---|---|---|---|
| 2015/0075839 A1 | 3/2015 | Sun et al. | |
| 2015/0104843 A1 | 4/2015 | Medoff | |
| 2015/0122243 A1 | 5/2015 | Galloway | |
| 2015/0122529 A1 | 5/2015 | Kjellqvist et al. | |
| 2015/0122802 A1 | 5/2015 | Zikeli et al. | |
| 2015/0152344 A1 | 6/2015 | Gueh | |
| 2015/0183641 A1 | 7/2015 | Wood et al. | |
| 2015/0184090 A1 | 7/2015 | Ni | |
| 2015/0203701 A1 | 7/2015 | Sun et al. | |
| 2015/0211730 A1 | 7/2015 | Medoff | |
| 2015/0217260 A1 | 8/2015 | Medoff | |
| 2015/0234304 A1 | 8/2015 | Takahashi et al. | |
| 2015/0265997 A1 | 9/2015 | Medoff | |
| 2015/0267036 A1 | 9/2015 | Cree | |
| 2015/0275108 A1 | 10/2015 | Gueh | |
| 2015/0299494 A1 | 10/2015 | Sun et al. | |
| 2015/0329879 A1 | 11/2015 | Masterman et al. | |
| 2015/0342224 A1 | 12/2015 | Medoff | |
| 2015/0344143 A1 | 12/2015 | Delgado, Jr. et al. | |
| 2015/0344914 A1 | 12/2015 | Medoff | |
| 2015/0353974 A1 | 12/2015 | Medoff | |
| 2015/0354426 A1 | 12/2015 | Douglas et al. | |
| 2015/0368762 A1 | 12/2015 | Dolan et al. | |
| 2016/0009554 A1 | 1/2016 | Gueh | |
| 2016/0024374 A1 | 1/2016 | Agrawal et al. | |
| 2016/0032341 A1 | 2/2016 | Medoff | |
| 2016/0033492 A1 | 2/2016 | Bentley | |
| 2016/0038905 A1 | 2/2016 | Medoff | |
| 2016/0038906 A1 | 2/2016 | Medoff | |
| 2016/0061383 A1 | 3/2016 | Arlt et al. | |
| 2016/0075953 A1 | 3/2016 | Maxwell et al. | |
| 2016/0090614 A1 | 3/2016 | Medoff | |
| 2016/0160240 A1 | 6/2016 | Masterman et al. | |
| 2016/0165926 A1 | 6/2016 | Medoff | |
| 2016/0167010 A1 | 6/2016 | Medoff | |
| 2016/0225490 A1 | 8/2016 | Munro et al. | |
| 2016/0237591 A1 | 8/2016 | Hanrath et al. | |
| 2016/0251535 A1 | 9/2016 | Chaudhary | |
| 2016/0257067 A1 | 9/2016 | Ganter et al. | |
| 2016/0257783 A1 | 9/2016 | Zhang et al. | |
| 2016/0265159 A1 | 9/2016 | Medoff | |
| 2016/0281482 A1 | 9/2016 | Nguyen et al. | |
| 2016/0289577 A1 | 10/2016 | Medoff | |
| 2016/0289704 A1 | 10/2016 | Medoff | |
| 2016/0289705 A1 | 10/2016 | Medoff | |
| 2016/0289706 A1 | 10/2016 | Medoff | |
| 2016/0289709 A1 | 10/2016 | Medoff | |
| 2016/0289710 A1 | 10/2016 | Medoff | |
| 2016/0293990 A1 | 10/2016 | Medoff | |
| 2016/0298141 A1 | 10/2016 | Medoff | |
| 2016/0298147 A1 | 10/2016 | Medoff | |
| 2016/0361992 A1* | 12/2016 | Aso | B60K 15/03 |
| 2016/0368370 A1* | 12/2016 | Aso | G01F 23/292 |
| 2016/0368374 A1* | 12/2016 | Aso | B60K 15/03 |
| 2016/0369757 A1* | 12/2016 | Aso | B60K 15/03 |
| 2017/0000145 A1 | 1/2017 | Foret | |
| 2017/0008394 A1* | 1/2017 | Aso | G01M 3/04 |
| 2017/0009060 A1 | 1/2017 | Sengupta et al. | |
| 2017/0009061 A1 | 1/2017 | Sun et al. | |
| 2017/0014763 A1 | 1/2017 | Douglas et al. | |
| 2017/0014764 A1 | 1/2017 | Douglas et al. | |
| 2017/0014765 A1 | 1/2017 | Douglas | |
| 2017/0022062 A1 | 1/2017 | Perez | |
| 2017/0022868 A1 | 1/2017 | Douglas | |
| 2017/0079325 A1 | 3/2017 | Mironov | |
| 2017/0080697 A1 | 3/2017 | Kusuura | |
| 2017/0087980 A1* | 3/2017 | Arras | B60K 15/03006 |
| 2017/0089304 A1 | 3/2017 | Dar | |
| 2017/0101312 A1 | 4/2017 | Mihailowitsch | |
| 2017/0101528 A1 | 4/2017 | Sengupta | |
| 2017/0121737 A1 | 5/2017 | Masterman | |
| 2017/0128927 A1 | 5/2017 | Garcia | |
| 2017/0130252 A1 | 5/2017 | Medoff | |
| 2017/0145886 A1 | 5/2017 | Douglas | |
| 2017/0152532 A1 | 6/2017 | Medoff | |
| 2017/0158840 A1 | 6/2017 | Sun | |
| 2017/0170477 A1 | 6/2017 | Fredrick | |
| 2017/0183477 A1 | 6/2017 | Caronia | |
| 2017/0190629 A1 | 7/2017 | Valette | |
| 2017/0210892 A1 | 7/2017 | Caronia | |
| 2017/0218816 A1 | 8/2017 | Douglas | |
| 2017/0218823 A1 | 8/2017 | Douglas | |
| 2017/0226907 A1 | 8/2017 | Douglas | |
| 2017/0233546 A1 | 8/2017 | Cree | |
| 2017/0252872 A1 | 9/2017 | Hartmann | |
| 2017/0260328 A1 | 9/2017 | Zhang | |
| 2017/0283258 A1 | 10/2017 | Fraunhofer | |
| 2017/0321233 A1 | 11/2017 | Medoff | |
| 2017/0334822 A1 | 11/2017 | Spohr | |
| 2019/0070953 A1* | 3/2019 | Arras | B60K 15/03 |
| 2020/0049114 A1* | 2/2020 | O'Connor | F02M 37/0088 |
| 2020/0139809 A1* | 5/2020 | Harms | F17C 1/16 |
| 2020/0391586 A1* | 12/2020 | Bouffier | B60K 15/03 |
| 2020/0406745 A1* | 12/2020 | Arras | B29C 49/20 |
| 2021/0300176 A1* | 9/2021 | Kuykendall | B60K 15/03177 |

FOREIGN PATENT DOCUMENTS

| | | |
|---|---|---|
| JP | 2007-254233 | 10/2007 |
| JP | 2009-513327 | 4/2009 |
| JP | 2014073923 A | 4/2014 |
| JP | 2016138594 A | 8/2016 |
| JP | 6308006 B2 | 4/2018 |
| KR | 10-1151501 B1 | 7/2012 |
| WO | 2000038497 A2 | 7/2000 |
| WO | 2003078054 A1 | 9/2003 |
| WO | 2011053326 A1 | 5/2011 |
| WO | 2015061215 A2 | 4/2015 |
| WO | 2017036794 A1 | 3/2017 |

OTHER PUBLICATIONS

International Search Report and Written Opinion issued in PCT/US2019/034284 dated Sep. 20, 2019.

International Search Report and Written Opinion issued in PCT/US2019/034288 dated Sep. 23, 2019.

\* cited by examiner

DUAL BLADDER FUEL TANK

CROSS-REFERENCE TO RELATED APPLICATION(S)

The present application claims priority to U.S. Provisional No. 62/677,620, filed May 29, 2018, titled "DUAL BLADDER FUEL TANK", the entire disclosure of which is hereby incorporated by reference herein and made part of the present disclosure. The present application is related to U.S. Non-Provisional Ser. No. 15/826,590 filed Nov. 29, 2017, titled "INDUCTIVELY HEATED MICROCHANNEL REACTOR"; U.S. Provisional No. 62/677,612, filed May 29, 2018, titled "MODULAR FUELING STATION"; U.S. Provisional No. 62/677,649, filed May 29, 2018, titled "MULTI FREQUENCY DRIVER FOR INDUCTIVE HEATERS"; and U.S. Provisional No. 62/677,640, filed May 29, 2018, titled "HOLC DEHYDROGENATION SYSTEM". The entire disclosures of the above-referenced applications are hereby incorporated by reference herein in their entireties and made part of the present disclosure.

TECHNICAL FIELD

The present disclosure relates to fluid storage systems.

BACKGROUND

There are several systems in use today for fuel storage in both stationary and mobile applications. Most involve a rigid container that is strong enough to hold back the pressure from the liquid. Some flexible single bladders are used for transporting certain fluids or slurries. Single bladder fuel tanks are used in high reliability environments, such as marine fuel storage, high performance racing, remote fuel sources, in aircraft and military applications. In some applications, bladders will line the inside of a tank to prevent leaks.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

DETAILED DESCRIPTION

Figure 1:
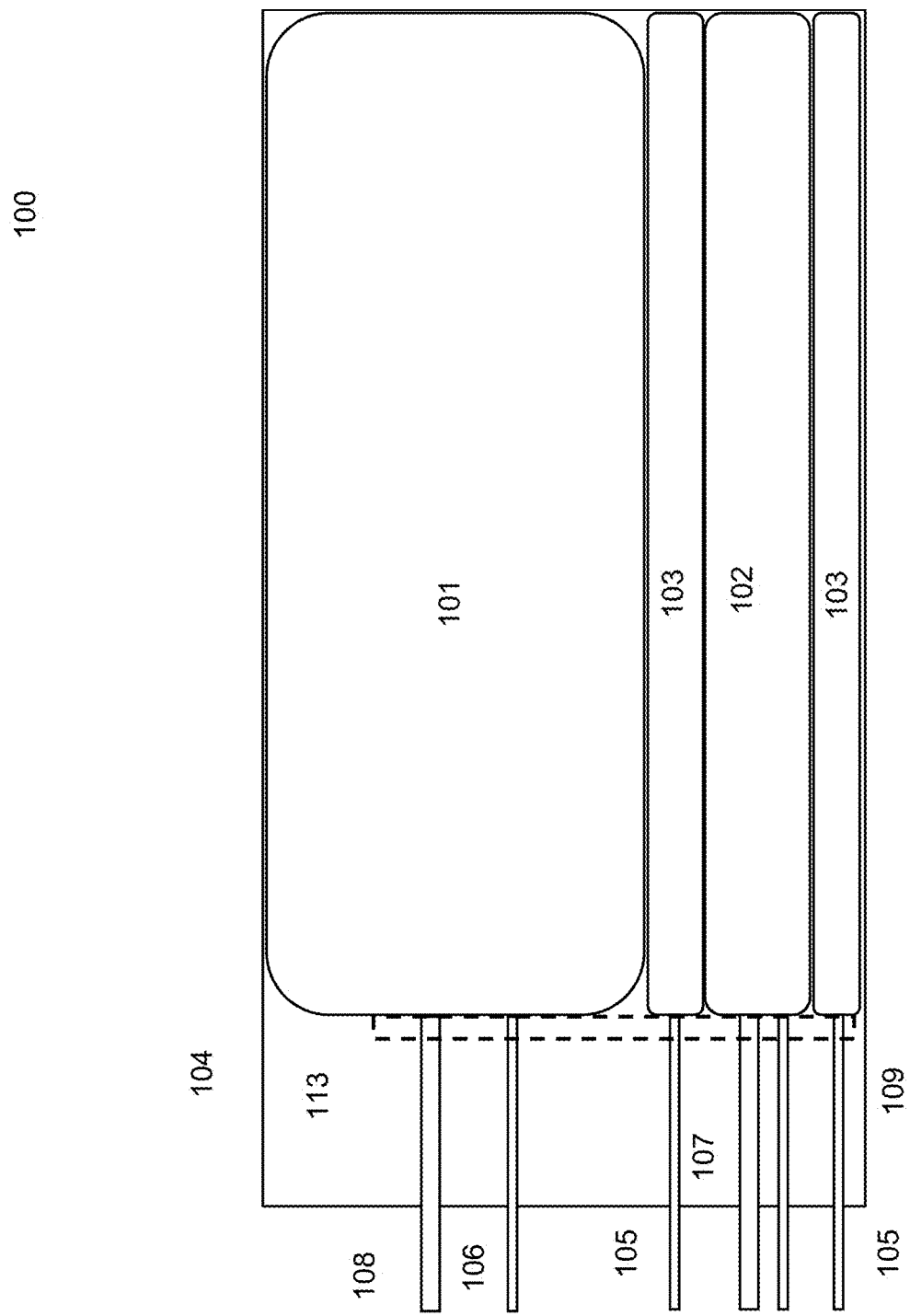
FIG. 1 schematically illustrates a dual bladder fuel tank.

FIG. 1 is a schematic illustration of a fluid container 100. The container 100 can be used to store, ship, and/or distribute various fluids. Such fluids can be liquids, gases, slurries, or some combination thereof. The fluids can include, but are not limited to, fuels (e.g., hydrogen, hydrogen on liquid carrier), water, food and beverage products, and/or industrial chemicals.

In some applications, fluid recycling is desirable. Preferably, fluid recycling systems that provide storage for the "spent" or "used" fluid (e.g., carrier fluid from which at least a portion of the usable component is removed) to be recycled. One option previously used was to provide a second, separate storage tank for collection of the spent carrier. Use of a separate tank or container can present challenges, including the need for additional space and footprint for the second container, additional piping and other fluid transfer structure, and additional weight. Each of these challenges is exacerbated in mobile applications, where space and weight are major limiting factors. Previously, capturing waste product from a process for later reuse or recycle has been cumbersome due to the cost of additional 'wasted' space to store it onboard and the additional handling steps and cost associated with hazmat chemicals. Additionally, redundant sensor systems were often required to separately monitor the fluid levels in the spent tank and in the unspent tank.

In the present disclosure, an advantageous solution is realized—use of two tanks in a single housing. More specifically, by mounting two flexible bladders inside the same tank, overall volume and size can remain substantially constant and spent or dehydrogenated can be stored on or in a vehicle for ready re-hydrogenation. For example, as fuel or other fluid from the first bladder is used, spent carrier fluid will be returned to the 'spent' tank, slowly filling as the main fuel is dehydrogenated or otherwise used. Additionally, a single sensor system or configuration may be used to monitor the fluid levels in both the spent and unspent tanks to notify the user of the container 100 when refill or re-hydrogenation is advised or required.

As illustrated, the container 100 includes an outer housing 104. The outer housing 104 can have a hollow or partially hollow interior volume. Two or more bladders or other containers can be positioned at least partially within interior volume of the outer housing 104. For example, a first fluid bladder 101 can be positioned above a second fluid bladder 102. In some applications, this vertical arrangement is reversed. One or more air pressure bladders 103 can be positioned within the interior volume of the housing 104. As illustrated, the air pressure bladders 103 can be positioned between, above, below, and/or otherwise near the fluid bladders 101, 102. Other receptacles may be used instead of or in additional to bladders. For example, bellows, bags, pistons, or other variable-volume receptacles may be used.

Preferably, adjacent bladders within the container 100 are in contact with each other over all or substantially all of their respective surfaces that face the respective adjacent bladders. For example, as illustrated, the first bladder 101 can be positioned directly above an air pressure bladder 103. In such an arrangement, all or substantially all of the bottom surface of the first bladder 101 is in contact with all or substantially all of the top surface of the adjacent air pressure bladder 103.

In some embodiments, materials and/or manufacturing methods are used to reduce friction between adjacent bladders. For example, the outer surfaces of one or more bladders may be coated or impregnated with Teflon® or some other low-friction material. In some applications, one or more inner walls of the housing 104 may be coated or otherwise treated with low-friction materials.

Maintaining contact between all or substantially all of the adjacent surfaces of the bladders can direct much or all of pressure forces between the bladders to a direction normal to the contact interfaces between the bladders. For example, in the illustrated arrangement of FIG. 1, each of the bladders is stacked vertically. In this arrangement, the pressure forces between the bladders is directed, for the most part, in the vertical direction (e.g., parallel to gravity in the frame of reference of FIG. 1).

In some applications, the interior of the housing 104 is open to the ambient environment. In such applications, pressure within the housing 104 is held substantially constant at the local atmospheric pressure. Preferably, the interior of the housing 104 is constructed from a rigid material and is sealed from the ambient environment and maintained at a pressure higher than the local atmospheric pressure. For example, the pressure within the housing 104 can be maintained at a level greater than both atmospheric pressure and the partial pressure of the fluids contained within the first and second bladders 101, 102. Maintaining such pressure (e.g., pressures in the range of 1-6 psi, 0-5 psi, 2-8 psi, and/or 3-15 psi) can allow the fluid within the fluid bladders 101, 102 to be maintained as a liquid, even if the fluid in the bladders 101, 102 would normally be a gas in the ambient environment.

The air pressure bladder(s) 103 can be configured to indicate the respective volumes of fluid within the first and second bladders 101, 102. For example, one or more of the air pressure bladders 103 can include an air pressure conduit 105 (e.g., a tube or other fluid conduit) connected to a pressure sensor. Reduced pressure within an air pressure bladder 103 would indicate reduced mass within the bladders above that air pressure bladder 103. Similarly, increased pressure within an air pressure bladder 103 would indicate increased mass within the bladders above that air pressure bladder 103. In the illustrated embodiment, one air pressure bladder 103 is positioned beneath (e.g., directly beneath) the second fluid bladder 102. The other air pressure bladder 103 is positioned between the first and second fluid bladders 101, 102 in the vertical direction. In this arrangement, the relative masses of the two fluid bladders 101, 102 can be determined by measuring the difference in detected pressure within the upper and lower air pressure bladders 103. More specifically, the measured pressure in the upper air pressure bladder 103 can be used to determine the mass of fluid within the first (e.g., upper) bladder 101, which can then be subtracted from the total mass determined from the measured pressure in the lower air pressure bladder 103 to determine the mass of fluid in the second (e.g., lower) fluid bladder 102. The measured masses of the fluids within the first and second fluid bladders 101, 102 can be used to calculate the volume of fluid within each bladder. In some applications (e.g., high pressure environments or low pressure environments), a compressor or pump could be used to inflate or deflate one or more of the air pressure bladders 103 to adjust the internal pressure of the outer housing 104 to a desired level.

As illustrated in FIGS. 1-4, the first fluid bladder 101 can be connected to at least one tube or other fluid conduit. Similarly, the second fluid bladder 102 can be connected to one or more fluid conduits. In the illustrated example, a tube 106 can be connected to the first fluid bladder 101. The tube 106 can facilitate fluid transfer between the first fluid bladder 101 and another component. For example, the tube 106 can be configured to connect to a filling port, a nozzle, a compressor, a reactor, or some other component. In some embodiments, the tube 106 is configured to connect to a hydrogen release module (HRM). A second tube 109 can be connected to the second fluid bladder 102. The second tube 109 can operate with respect second fluid bladder 102 in a manner similar to or the same as the operation described above with respect to the tube 106.

In use, the first and second bladders 101, 102 are configured to operate in conjunction with each other to maintain a constant or substantially constant cumulative volume. More specifically, as fluid is introduced to one of the bladders 101, 102 via one of the tube 106, 109, the pressure within the housing 104 is increased. Additionally, a pressure-induced force (e.g., in the vertical direction according to the orientation of the bladders in FIGS. 1-4) is applied either directly from one fluid bladder to the other, or indirectly through an intermediate air pressure bladder 103. The increased pressure within the housing 104, as well as the pressure-induced force exerted by the fluid bladder being filled, cause the other bladder to contract and to release fluid via the respective tube connected to the releasing bladder. For example, as fluid is introduced into the first fluid bladder 101 via the first tube 106, the above-described pressure forces cause fluid to exit the second fluid bladder 102 via the second tube 109. In some embodiments, a pressure release valve can be configured to open in response to the above-described pressure forces to allow fluid to exit the second bladder 102. A same or similar reciprocal process occurs when fluid is introduced to the second fluid bladder 102. Use of this dual-bladder structure allows for a single container 100 with a single housing 104 to be used to both supply fluid to and collect fluid from a separate component, vehicle, tank, or other device without requiring a separate container for collecting used carrier.

Figure 2:
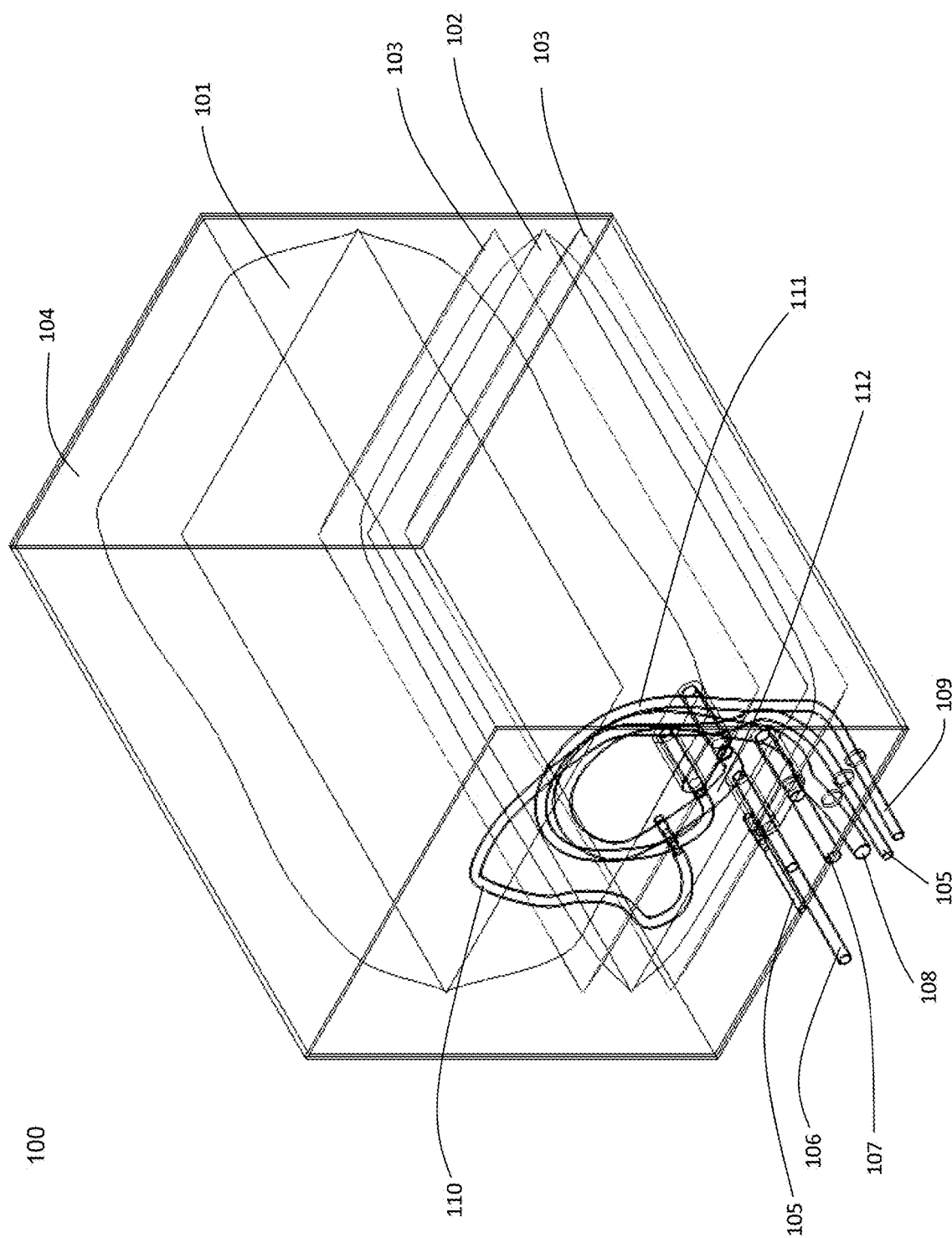
FIG. 2 is a front, right, top perspective view of an embodiment of a dual bladder fuel tank with the outer housing depicted as transparent.
Figure 3:
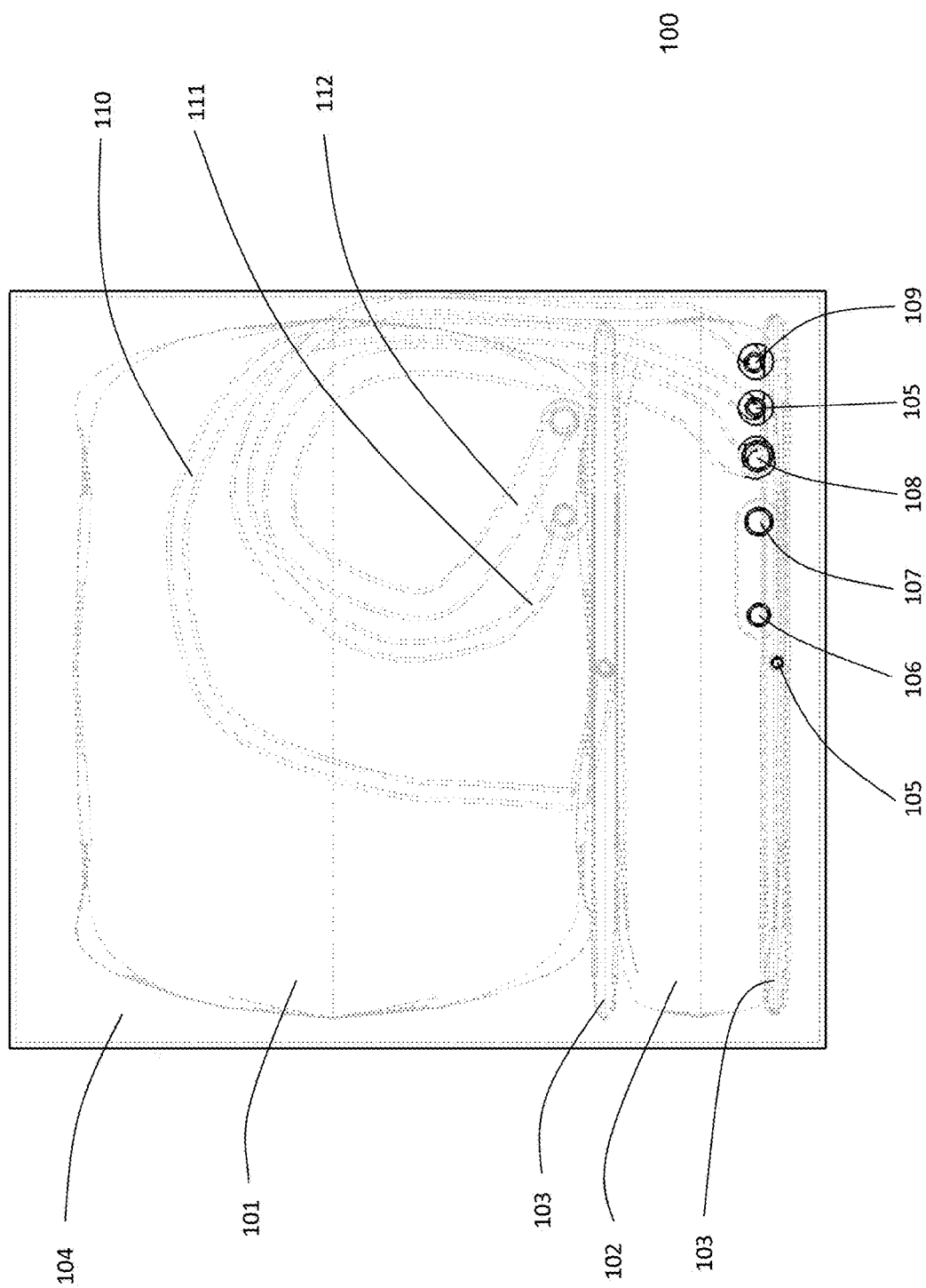
FIG. 3 is a front plan view of the fuel tank of FIG. 2.
Figure 4:
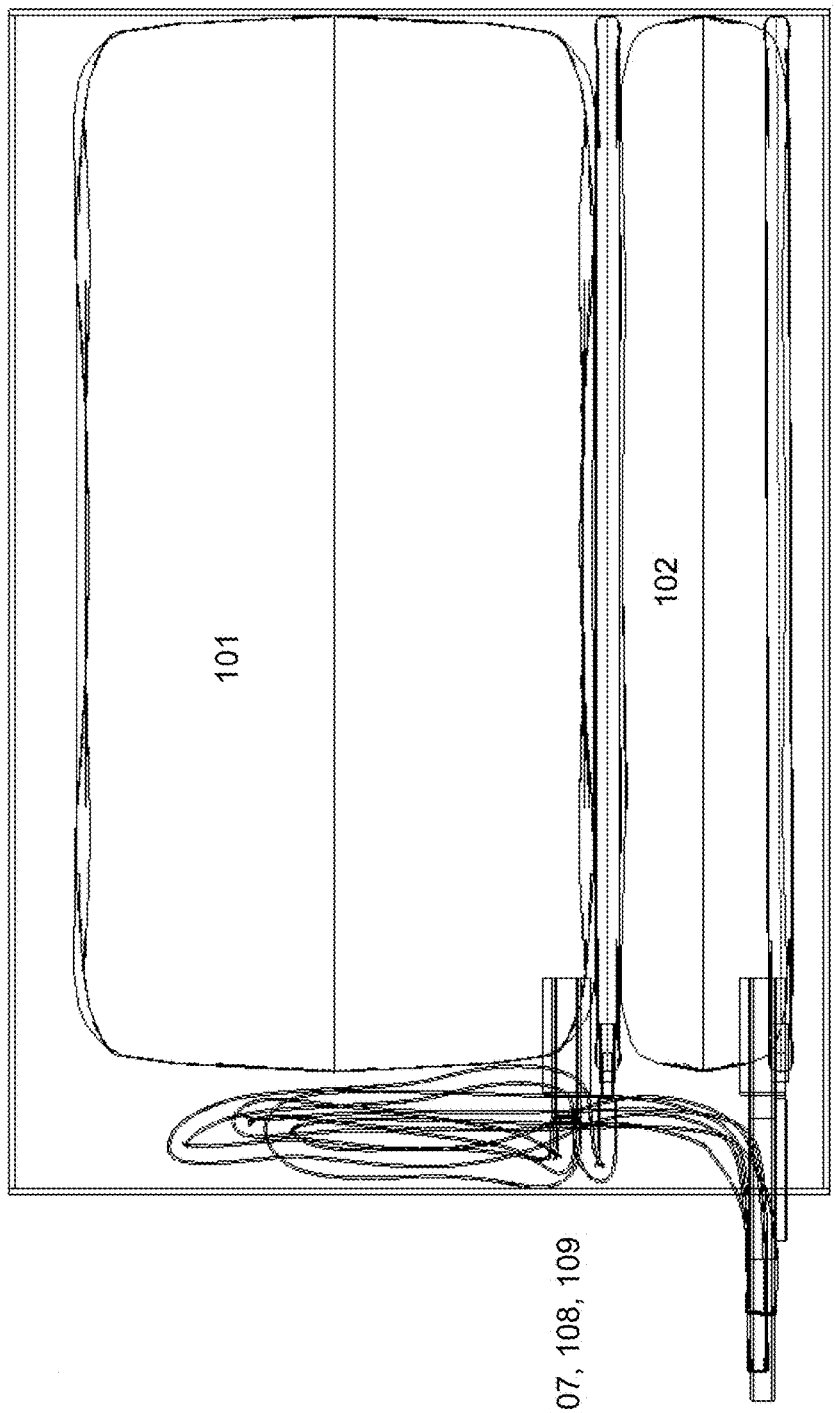
FIG. 4 is a right-side plan view of the fuel tank of FIG. 2.

In some embodiments, one or both of the first and second fluid bladders 101, 102 are connected to more than one tube or other fluid conduit. One or more of the tubes can be configured to permit bidirectional fluid flow (e.g., flow toward the bladders or away from the bladders). As illustrated in FIGS. 1 and 2, a tube 108 can be connected to the first bladder 101 in addition to the tube 106 described above. The second tube 108 can, in some applications, be coaxial with the first tube 106. Similarly, a tube 107 can be connected to the second bladder 102 in addition to the tube 109 described above. In some embodiments, the second tube 109 is coaxial with the first tube 107. The tubes 107, 108 can have greater cross-sectional areas than the cross-sectional areas of one or both of the tubes 106, 109. In some embodiments, the tube 107, 108 are configured to facilitate higher volumetric flow rates into and out from the bladders 101, 102 than the tubes 106, 109. For example, the tubes 107, 108 can be configured to connect to a tank filling port. In some embodiments, the tubes 107, 108 (e.g., the "high-flow" tubes) are positioned adjacent each other such that both tubes 107, 108 are simultaneously coupled with a single port, plug, or other fluid interface. One or more interface plates 113 (FIG. 1) or other interface structures may be used to facilitate coupling of the tubes to the bladders.

In some embodiments, as the bladders 101 and 102 are filled/depleted, the relative positions of the connection points between the bladders 101, 102, 103 may change with respect to the housing 104 (e.g., upward and downward in the frame of reference of FIG. 1). Flexible tubing may be used to accommodate the movement and to allow for continued connection between the bladders and other components. For example, flexible tubes 111, 112 can be used to connect the first (e.g., upper) fuel bladder 101 to tubes 109 and 108, respectively. Similarly, flexible tube 110 may be used to connect the upper air bladder 103 to tube 105. The second (e.g., lower) fuel bladder 102 and/or the lower air pressure bladder may include flexible tubing in addition to or instead of the flexible tubing described above.

Preferably, one or more check valves and/or other flow control devices are used to control the flow rates into and out from the bladders 101, 102, 103. In some embodiments, solenoid valves or other electronically-controlled flow devices are used to control fluid flow to and from the bladders. In some embodiments, a plurality of flow devices are controlled via local or remote hardware to coordinate and control flow of fluid through the bladders.

In a preferred application, the container 100 can be configured for use with hydrogen fuel. Specifically, one of the fluid bladders 101, 102 can be used to store unspent hydrogen fuel and the other bladder 101, 102 can be used to store dehydrogenated or partially dehydrogenated carrier. The container 100 can be positioned on and/or within a vehicle and can be used to provide the fuel necessary to propel or otherwise operate the vehicle. Preferably, the lower fluid bladder (second bladder 102 in the illustrated embodiment) is preloaded with unspent fuel. Because the pressure head is higher for the fluid in the lower bladder than in the upper fluid bladder, a smaller, lighter, and/or more energy-efficient pump may be used to transfer fluid out from the lower fluid bladder to an HRM or other hydrogen-extraction apparatus.

While the illustrated embodiments utilize two fluid bladders and two air pressure bladders, other configurations may be used in a manner consistent with the innovations of the present disclosure. For example, the container may include more than two fluid bladders and/or more than two air pressure bladders. Various fluid bladders in such an arrangement may have a proportional relationship similar to or the same as the relationship described above with respect to the two bladders 101, 102 (e.g., when one bladder inflates, one or more other bladders deflate to maintain substantially constant total volume). Use of more than two fluid bladders can facilitate storage and use of more than two types of fluids, thereby increasing the possible applications for the bladder container system.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A fluid tank comprising:
  an outer housing comprising a housing volume;
  a first fluid bladder positioned within the housing volume;
  a first conduit in fluid communication with the first fluid bladder;
  a second fluid bladder positioned within the housing volume; and
  a second conduit in fluid communication with the second fluid bladder;
  wherein:
    the first fluid bladder is configured to release fluid through the first conduit in response to introduction of fluid into the second fluid bladder via the second conduit; and
    the housing volume is maintained at a substantially constant pressure when fluid is released from the first fluid bladder through the first conduit and when fluid is introduced into the second fluid bladder through the second conduit.

2. The fluid tank of claim 1, wherein the second fluid bladder is configured to release fluid through the second conduit in response to introduction of fluid into the first fluid bladder via the first conduit, and wherein the housing volume is maintained at a substantially constant pressure when fluid is released from the second fluid bladder through the second conduit and fluid is introduced into the first fluid bladder through the first conduit.

3. The fluid tank of claim 1, further comprising:
  a first air bladder positioned between and in contact with the first fluid bladder and with the second fluid bladder; and
  a third conduit in fluid communication with the first bladder.

4. The fluid tank of claim 3, further comprising a second air bladder positioned between and in contact with the second fluid bladder and with a wall of the outer housing.

5. The fluid tank of claim 4, wherein the second air bladders is positioned between and in contact with the second fluid bladder and a bottom wall of the outer housing.

6. The fluid tank of claim 3, further comprising a first air conduit configured to provide fluid communication between the first air bladder and a pressure sensor.

7. The fluid tank of claim 6, further comprising a second air conduit configured to provide fluid communication between the second air bladder and a pressure sensor.

8. The fluid tank of claim 3, further comprising a fourth conduit configured to facilitate fluid transfer between the first fluid bladder and a fluid source.

9. The fluid tank of claim 8, further comprising a fifth conduit configured to facilitate fluid transfer between the second fluid bladder and a fluid source.

10. The fluid tank of claim 9, wherein the fifth conduit has a smaller cross-sectional area than the second conduit.

11. The fluid tank of claim 8, wherein the fourth conduit has a smaller cross-sectional area than the first conduit.

12. The fluid tank of claim 1, wherein the outer housing is constructed from a rigid material.

* * * * *